Patented July 13, 1926.

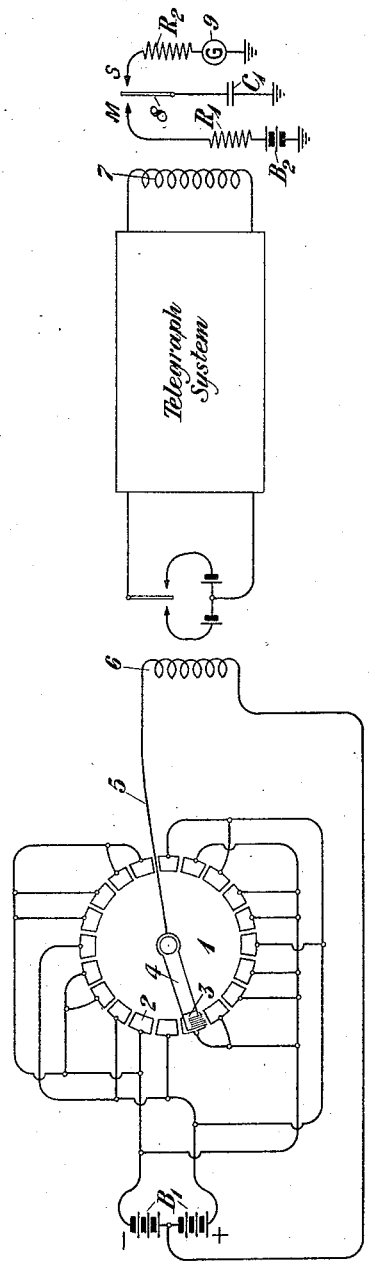

1,591,994

UNITED STATES PATENT OFFICE.

HARRY NYQUIST, OF ELMHURST, NEW YORK, ASSIGNOR TO AMERICAN TELEPHONE AND TELEGRAPH COMPANY, A CORPORATION OF NEW YORK.

ELECTRICAL MEASURING APPARATUS.

Application filed December 2, 1920. Serial No. 427,903.

This invention relates to electrical measuring apparatus for determining the rate of signaling over various telegraph and other signaling systems, and particularly to a device for determining the maximum rate of signaling attainable before the system fails to transmit.

Heretofore it has been customary to measure the breakdown rate of signaling of telegraph systems by means of a tape recorder. Such system involved the impression upon the telegraph system of certain predetermined impulses which would be recorded upon the tape of the recorder connected with the distant end of the system. The rate of signaling would be gradually increased until a point was reached, when the recording apparatus would fail to record the received impulses. In order to determine the rate of signaling at which the breakdown occurred, it was necessary to know accurately the speed with which the tape moved.

It is the object of this invention to provide an arrangement for determining the breakdown rate of signaling which indicates directly the speed at which failure occurs and thereby avoids the difficulty which was inherent in the systems heretofore used.

This invention will be clearly understood from the following description when read in connection with the attached drawing which shows one form of embodiment of the invention.

In the drawing, 1 represents an impulse sending device consisting in a plurality of segments 2 over which sweeps a brush 3 connected with an arm 4 which is adapted to be rotated at varying speeds. Each of the segments is connected with a source of current in such manner that the respective segments will have the proper polarity for producing the correct predetermined signal 1 when the brush 3 is moved across the said segments. The brush 3 is connected through the arm 4 and conductor 5 with the winding 6 of a transmitting relay, the other side of the said winding being connected to the neutral point of the battery $B_1$. The transmitting relay is adapted to apply to the telegraph system marking or spacing signals in accordance with the character of the impulses sent through the winding 6 as the brush 3 moves over the segments. Connected with the distant end of the telegraph system is a receiving relay involving a winding 7 which is adapted to move the armature 8 to the marking or spacing contacts of said relay, depending upon the character of the received impulse. Connected with the marking contact is a battery $B_2$ and a resistance $R_1$. The spacing contact has connected therewith a galvanometer or other form of electrical measuring device 9, and a resistance $R_2$. Connected with the armature 8 of the said relay is a condenser $C_1$.

When a marking impulse is received over the telegraph system the armature 8 is moved to its marking contact thereby allowing the battery $B_2$ to charge the condenser $C_1$ connected with the armature of the said relay. When the armature is moved to its spacing contact in accordance with the reception of a spacing impulse over the said system, the energy of the condenser will be discharged through the galvanometer 9. The period of this galvanometer is great in comparison with the time intervening between successive impulses. The resistances in series with the battery $B_2$ and the galvanometer 9 are so chosen that the time constants of the circuits will be small in comparison with the duration of the dots to be measured, that is, approximately .001 second.

Having in mind the foregoing description of the parts of the apparatus in which this invention is embodied and the functions of each part, the invention will be clearly understood from the following description of its mode of operation.

Let it be assumed that a given signal such as, for example, a particular letter be repeated into the system at regular intervals and that the speed of transmission is such that a receiving relay is able to follow the transmitted signals. As has been stated, when the armature of the receiving relay is on its marking contact, the condenser will charge to the full voltage of the battery. When it is on the spacing contact the condenser will discharge completely through the meter thereby transferring a definite quantity of electricity from the battery through the meter to ground for every marking impulse transmitted over the system. The number of impulses passing through the meter will be directly proportional to the rate of signaling and therefore the reading of the meter will also be directly proportional to the rate of signaling of the marking impulses. As the rate of signaling is increased by more rapid rotation of the brush 3 over the segments, a point will finally be reached when the receiving relay will no longer be able to follow the transmitted signals. Consequently, the number of marking impulses will be decreased and the indication given by the meter will be less. The indication of the meter just before the needle falls back is the rate of signaling at which failure occurs. This determination of the speed of failure could also be obtained by starting at a relatively high speed, that is above the speed of failure, and reducing the rate of signaling the impulses until the needle of the meter begins to indicate the rate of steady transmission.

It is possible to select a condenser $C_1$ and a battery $B_2$ of such magnitude that the meter will indicate the speed directly in dots per second, the meter being calibrated in accordance with the number of dots present in the signal transmitted. If a different signal is chosen involving a different number of dots for marking impulses, the meter may be recalibrated by proper adjustment of the resistance $R_1$ and the battery $B_2$, or by varying the magnitude of the condenser $C_1$, or by putting a shunt of the proper magnitude about the meter 9.

It will be seen from the foregoing description that this invention provides an efficient arrangement for the determination of the maximum rate of signaling that may be carried on over a telegraph system without causing the failure of the receiving apparatus to properly record transmitted signals.

Although this invention has been disclosed in a certain form, it is capable of embodiment in other and different forms without departing from the spirit and scope of the appended claims.

What is claimed is:—

1. In a device for measuring the rate of signaling, the combination with a line circuit of means for applying impulses thereto at a steadily increasing rate, a receiving relay connected with the said line circuit and having a source of energy connected therewith, an indicating device whose period is great relative to the interval between successive impulses, and energy storage means arranged to be alternately charged by the said source of energy and to apply its charge to said indicating means whereby the rate of signaling over the said circuit may be directly indicated.

2. In a device for measuring the rate of signaling, the combination with a line circuit of means for applying thereto impulses of predetermined polarity, a receiving device connected with the said line circuit responsive to the said impulses, the said receiving device having a source of energy and energy storage means connected thereto, and an indicating device whose period is great relative to the interval between successive impulses adapted to be alternately connected with and disconnected from the said energy storage means to indicate automatically the rate of signaling at which failure occurs.

3. In a device for measuring the rate of signaling, the combination of a line circuit, an impulse sending device, a receiving relay and a condenser connected with the grounded armature of the said relay, the said condenser being adapted to be charged when an impulse of one polarity reaches the said relay, and a meter adapted to receive the charge of energy from the said condenser when an impulse of opposite polarity is impressed on the said relay.

4. In a device for measuring the rate of signaling, the combination of a line circuit, a source of impulses connected with one end of the said line circuit, and a receiving relay connected with the other end of the said circuit, a condenser connected with the armature of the said relay, the said condenser being charged when the armature is moved to one of the contacts of the said relay as the result of the reception of an impulse of one polarity over the said line circuit and a measuring device to receive the charge of energy from the said condenser when the said armature is moved to the other contact of the said relay as the result of the reception of an impulse of opposite polarity over the said line circuit.

5. The method of determining the breakdown rate of signaling, which consists in transmitting a series of impulses of different polarities, allowing the said impulses to control the charging and discharging of an energy storage system, and measuring the rate of charge and discharge of the said system.

6. In a device for measuring the rate of signaling, the combination of a line circuit, an impulse sender adapted to transmit signals at various rates, and a receiving device designed to indicate automatically the rate of signaling.

7. In a device for measuring the rate of signaling, the combination of a line circuit, an impulse sender adapted to impress upon said line circuit signals at various rates, and a receiving device adapted to receive the signals transmitted over said line circuit and to indicate automatically the maximum rate of signaling attainable before failure occurs.

8. The method for determining the breakdown rate of signaling which consists in transmitting a group of impulses constituting a signal, impressing said signals on an energy storage system in such manner as to charge or discharge said system, depending on the polarity of the impulses constituting said signal and determining the rate of discharge of said system.

9. The method of determining the breakdown rate of signaling which consists in transmitting over a system a series of impulses of different polarities to control the charging and discharging of an energy storage system, measuring the charge taken by the said storage system at a predetermined speed of transmission of the said signals, then increasing the rate of signaling, and noting the rate at which the energy storage system fails to take its maximum charge by virtue of the failure of the system to transmit signals at that rate.

In testimony whereof, I have signed my name to this specification this 1st day of December 1920.

HARRY NYQUIST.